United States Patent [19]

Dean

[11] Patent Number: 4,528,326
[45] Date of Patent: Jul. 9, 1985

[54] POLYAMIDE-IMPACT MODIFIED STYRENIC POLYBLENDS

[75] Inventor: Barry D. Dean, Springfield, Pa.

[73] Assignee: Atlantic Richfield Company, Los Angeles, Calif.

[21] Appl. No.: 509,544

[22] Filed: Jun. 30, 1983

[51] Int. Cl.³ .................. C08L 75/00; C08L 51/00
[52] U.S. Cl. ........................................ 525/66; 525/92
[58] Field of Search ............................ 525/66, 92

[56] References Cited

U.S. PATENT DOCUMENTS 3,998,907 12/1976 DiGiulio .............................. 525/57
4,339,376 7/1982 Kasahara et al. ..................... 525/66

Primary Examiner—John C. Bleutge
Assistant Examiner—A. L. Carrillo
Attorney, Agent, or Firm—Dennis M. Kozak

[57] ABSTRACT

Polyblends of impact modified styrene/$\alpha,\beta$-unsaturated dicarboxylic anhydride or imide copolymers and polyamides are disclosed. The resulting molded articles exhibit excellent mechanical strength, resistance to chemicals, toughness and resistance to heat.

14 Claims, No Drawings

POLYAMIDE-IMPACT MODIFIED STYRENIC POLYBLENDS

This invention relates to polyblends.

More specifically, this invention pertains to molded articles produced from polyblends comprised of impact modified styrenic/α,β-unsaturated dicarboxylic anhydride (or its imide derivative) copolymers and polyamides. The resulting molded articles exhibit excellent mechanical strength, resistance to chemicals, toughness and heat resistance.

Toughening of polyamide resins by melt compounding with both nitrile rubbers and rubber modified styrene/acrylonitrile copolymers is demonstrated in German Offen. Nos. 2,742,176; 2,758,568; 2,906,222 and 2,943,515. European Patent No. 0010938 and U.S. Pat. No. 3,966,839 demonstrate the use of low molecular weight styrene/maleic anhydride resins (MW<4,000) as compatibilizing agents for polyamides with polystyrene and polyamides with n-butylacrylatehydroxyethyl methacrylate copolymers with the result being a toughened polyamide resin. Additional examples of toughening polyamides are demonstrated in German Offen. No. 2,403,889, which teaches the use of high impact polystyrene (<40 weight %) and in European Pat. No. 0049103 which teaches the use of styrene/maleimide polymers.

According to this invention, there is provided a polyblend comprising from about 35 to about 70 weight percent of a polyamide resin having seven or more methylene units separating each amide bond, and from about 65 to about 30 weight percent of an impact modified styrenic/α,β-unsaturated dicarboxylic anhydride or imide copolymer resin, the copolymer resin being impact modified with a rubber material (defined below) and a thermoplastic elastomer, (defined below).

As used herein, the term "rubber material" shall mean a polymer having a glass transition temperature of less than or equal to −40° C., with 70 to 100 percent by weight of the polymer being recurring units of at least one monomer selected from the group consisting of butadiene, ethylene, propylene and nonconjugated dienes and 30 to 0 percent by weight of the polymer being recurring units of at least one monomer selected from the group consisting of styrene and acrylonitrile.

Preferably, the rubber material will have a glass transition temperature of less than or equal to −80° C.

As used herein, the term "thermoplatic elastomer" shall mean a polymer having a glass transition temperature of greater than or equal to −25° C., with 5 to 35 percent by weight of said polymer being recurring units of butadiene and 65 to 95 percent by weight of said polymer being comprised or recurring units of at least one monomer selected from the group consisting of styrene and methylmethacrylate.

Preferably, the thermoplastic will have a glass transition temperature of greater than or equal to −20° C.

Polyamides suitable for use in the polyblends of this invention include nylon 8, nylon 11 and nylon 12. Nylon 8 is made from capryllactam which is a butadiene derivative. Nylon 11 is made from 11-aminoundecanoic acid. And, Nylon 12 is made from lauryllactam, also a butadiene derivative. Nylon 12 is particularly suitable for use and is preferred. The peak molecular weight (PMW) of the above polyamides should be within the range of from 20,000 to 50,000 but most preferably greater than 35,000.

The impact modified styrenic/α,β-unsaturated dicarboxylic anhydride or imide copolymer resin employed in the polyblend of this invention is comprised of from about 70 to about 99 weight percent of a styrenic i.e. monoalkenyl aromatic monomer and from about 1 to about 30 weight percent of an α,β-unsaturated dicarboxylic anhydride or imide. The monoalkenyl aromatic monomer can be selected from styrene, para-methylstyrene, α-methylstyrene, t-butylstyrene or any halogenated styrene, e.g., dibromostyrene. The α,β-unsaturated dicarboxylic anhydride can be maleic anhydride, citraconic anhydride or a combination of the two, as well as their imide derivatives i.e. maleimide n-phenylmaleimide, n-methylmaleimide, citraconimide, n-phenylcitraconimide and n-methyl citraconimide and their mixtures, but most preferably is maleic anhydride. The molecular weight (PMW) of the styrenic matrix should be between 100,000 and 500,000 but most preferably will be between 200,000 and 300,000.

The impact modified styrenic/α,β-unsaturated dicarboxylic anhydride or imide copolymer resin will contain from about 10 to about 25 weight % rubber material based on the total weight % of the copolymer resin including the weight of the rubber material and the thermoplastic elastomer. Preferably, the copolymer resin will contain from about 14 to about 22 weight % rubber material.

Rubber materials suitable for use in this invention are commercially available and include, for example, two polybutadienes designated "NF Diene 55" and "NF Diene 35" both commercially available from Firestone Rubber Co.; an acrylonitrile rubber designated "PARACRIL", commercially available from B. F. Goodrich; ethylenepropylene copolymer (EP) and ethylene-propylene-diene (EPDM) both designated "Polysar" and, commercially available from Polysar Corporation and a number of the styrene/butadiene rubbers commercially available from Goodyear under the designation "Stereon."

The impact modified styrenic/α,β-unsaturated dicarboxylic anhydride or imide copolymer resin will contain from about 1 to about 8 weight % thermoplastic elastomer based on the total weight % of the copolymer resin including the weight of the rubber material and the thermoplastic elastomer. Preferably, the copolymer resin will contain from about 2 to about 6 weight % thermoplastic elastomer.

Examples of some commercially available thermoplastic elastomers suitable for use include a styrene-butadiene radial triblock polymer designated "KRO-3", commercially available from Phillips Chemical Company and a methylmethacrylate-butadiene-styrene (MBS) terpolymer designated "KM 653 Acryloid", commercially available from Rohm & Haas.

The following examples serve to further demonstrate the preparation of polyblends of this invention. Evaluation of material properties was performed based on the following ASTM standard tests: flexural strength and modulus (D-790), tensile strength (D-638), notched Izod (D-256) and DTUL (deflection temperature under load at 264 psi, D648). Gardner falling weight index was established using a 1¼" diameter orifice and an 8 pound ½" diameter weight. Melt flow parameters were established via melt indexing.

EXAMPLE 1

This example demonstrates the preparation of an impact modified styrene/maleic anhydride copolymer suitable for use in the practice of this invention.

In a one gallon reactor, 151 grams of a rubber material "Diene-55" (polybutadiene) and 21 grams of a thermoplastic elastomer "KRO-3" (styrene-butadiene radial triblock polymer) were dissolved in 2000 grams of styrene at ambient temperature (25° C.). Once all the rubber material and thermoplastic elastomer had dissolved, 100 grams of maleic anhydride was added to the reactor and stirring continued until all of the maleic anhydride had dissolved. A second solution of 87.5 grams of maleic anhydride and 1.86 grams of benzoyl peroxide in 500 grams of styrene was prepared. And, about 1.0 gram of benzoyl peroxide was added directly to the reactor and the temperature was raised to 90° C. After 15 minutes at 90° C., a continuous addition of the styrene/maleic anhydride-benzoyl peroxode solution was initiated and allowed to proceed in such a manner that addition was completed in 35 minutes. The reaction was allowed to continue for an additional 25 minutes before being stopped short by the addition of 0.2 g of hydroquinone. The reaction syrup was devolatilized in a vacuum oven at 85° C./30 mm Hg pressure. The resulting impact modified styrene/maleic anhydride copolymer (hereinafter referred to as SMA-1) was recovered, converted to grinds, pelletized and specimens were injection molded. Prior to extrusion and molding the SMA-1 copolymer grinds were mixed with 4 grams of N,N-diphenyl-p-phenylene diamine and 4 grams of tris(-dinenyl)-dinonyl phenyl phosphite for stabilization. Table I lists the SMA-1 copolymer properties.

TABLE I

| | |
|---|---|
| % MA (on styrene matrix) | 22 |
| % rubber material and thermoplastic elastomer (based on total SMA-1 weight) | 18 |
| % Solids | 33 |
| Tensile Strength (psi) | 4000 |
| Flexural Strength (psi) | 8000 |
| DTUL (⅛", °F., unannealed) | 235 |
| Notched Izod (ft-lbs/in) | 1.8 |
| Gardner Falling Weight Index (in-lbs) | 70 |

The above SMA-1 copolymer was then melt compounded with nylon 12 resin as is described in following Example 2.

EXAMPLE 2

This example demonstrates the preparation and properties of a (50:50) polyblend of nylon 12 resin (Huels L2101) and SMA-1 copolymer.

Compounding was accomplished by multiple passes through a twin screw extruder at between 470°–500° F. Test specimens were injection molded to evaluate properties. Table II illustrates the properties of the 50:50 weight % SMA-1/nylon 12 copolymer blend.

TABLE II

| | SMA-1/Nylon 12 Copolymer Blend (50:50) |
|---|---|
| Tensile Strength (psi) | 6800 |
| Flexural Strength (psi) | 9500 |
| DTUL (⅛", °F., unannealed) | 201 |
| Notched Izod (ft-lbs/in) | 2.5 |
| Gardner Falling Weight Index (in-lbs) | 370 |

To assess the chemical resistance of the SMA-1/nylon 12 blend as compared to the SMA-1 copolymer, microtensile bars of each were weighed then immersed in various solvents for 48 hours. The microtensile bars that remained were dried under vacuum for 48 hours at 25° C. The weight after drying was compared to the weight prior to immersion and a % weight loss was determined. The chemical resistance of the SMA-1/nylon 12 blend was found to be much improved over that of the SMA-1 copolymer. The test results are shown in Table III below.

TABLE III

| Solvent | SMA-1 Copolymer (% weight loss) | SMA-1/Nylon 12 Blend (50:50) (% weight loss) |
|---|---|---|
| Toluene | 100, Complete dissolution | 2.9 |
| Tetrahydrofuran | 100, Complete dissolution | 1.9 |
| Methyl Ethyl Ketone | 100, Complete dissolution | 2.0 |
| Trichloroethylene | 100, Complete dissolution | 3.0 |

EXAMPLE 3

A nylon 12 resin (Huels L2101) was melt compounded with another impact modified styrene-maleic anhydride copolymer containing 14 weight % maleic anhydride, on the styrene matrix, 15 weight % rubber material (Stereon 720) and 7% thermoplastic elastomer (KRO-3) the weight % of both modifiers is based on the total weight of the impact modified styrene/maleic anhydride copolymer. The impact modified styrene/maleic anhydride copolymer was prepared using substantially the procedure of Example 1 and is hereinafter referred to as "SMA-2". Compounding to produce a 50:50 polyblend was accomplished by multiple passes through a twin screw extruder at between 470°–500° F. Test specimens were injection molded to evaluate properties. Table IV compares the properties of the SMA-2 copolymer and a 50:50 weight % SMA-2/nylon 12 blend.

TABLE IV

| | SMA-2 Copolymer | SMA-2/Nylon 12 Blend (50:50) |
|---|---|---|
| Tensile Strength (psi) | 4700 | 7300 |
| Flexural Strength (psi) | 8000 | 9300 |
| DTUL (⅛", °F., unannealed) | 212 | 185 |
| Notched Izod (Ft-Is/in) | 2.5 | 3.0 |
| Gardner Falling Index (in-lbs) | 76 | 440 |

As can be seen from Table IV, the mechanical properties of the SMA-2/nylon 12 blend are much improved over the properties of the base SMA-2 copolymer except for a slight lowering of the heat property.

Additionally, the blend exhibited a much improved melt flow as compared with either the SMA-2 copolymer or nylon 12 resin alone. Both the SMA-2 copolymer, the nylon 12 resin, and the 50:50 SMA-2/nylon 12 blend were subjected to the same number of extruder passes and the same molding profile with the result being that the melt index of the 50:50 SMA-2/nylon 12 blend at 470° F. was 18 grams/10 minutes while those of the SMA-2 copolymer and nylon 12 resin were 9.2 and 8.5 grams/10 minutes, respectively.

Chemical resistance studies of the SMA-2/nylon 12 blend were arrived at as in Example 2. Table V sets forth the results obtained:

TABLE V

| Solvent | SMA-2 Copolymer (% weight loss) | SMA-2/Nylon 12 Blend (50:50) (% weight loss) |
|---|---|---|
| Toluene | 100, Complete dissolution | 3.5 |
| Tetra-hydrofuran | 100, Complete dissolution | 2.0 |
| Methyl Ethyl Ketone | 100, Complete dissolution | 2.2 |
| Trichloroethylene | 100, Complete dissolution | 3.1% |

EXAMPLE 4

A nylon 12 resin (Huels L2101) was melt compounded with another impact modified styrene/maleic anhydride copolymer containing 8 weight % maleic anhydride on the styrene matrix, 15 weight % rubber material (Stereon 720) and 7 weight % thermoplastic elastomer (KRO-3), the weight % of both modifiers is based on the total weight of the impact modified styrene/maleic anhydride copolymer. The impact modified styrene/maleic anhydride copolymer was prepared using substantially the procedure of Example 1 and is hereinafter referred to as "SMA-3". Compounding to produce a 50:50 polyblend and a 62.5:37.5 polyblend was accomplished as in Example 2. Table VI compares these materials: SMA-3, SMA-3/nylon 12 (62.5:37.5), and SMA-3/nylon 12 (50:50).

TABLE VI

| | SMA-3 Copolymer | SMA-3/ Nylon 12 Blend (62.5:37.5) | SMA-3/ Nylon 12 Blend (50:50) |
|---|---|---|---|
| Tensile Strength (psi) | 4200 | 5100 | 6800 |
| Flexural Strength (psi) | 8100 | 8500 | 9700 |
| DTUL (⅛", °F., unannealed) | 185 | 181 | 172 |
| Notched Izod (ft-lbs/in) | 2.1 | 2.3 | 3.0 |
| Gardner Falling Weight Index | 144 | 180 | >480 |
| Melt Index (g/10 min at 475° F.) | 8.1 | 18.5 | 20.2 |

Chemical resistance studies of the SMA-3/nylon 12 blends were arrived at as in Example 2. Table VII compares the SMA-3 copolymer with the two SMA-3/nylon 12 blends.

TABLE VII

| Solvent | SMA-3 Copolymer (% weight loss) | SMA-3/ Nylon 12 Blend (62.5:37.5) (% weight loss) | SMA-3/ Nylon 12 Blend (50:50) (% weight loss) |
|---|---|---|---|
| Toluene | 100, Complete dissolution | 20 | 3.8 |
| Tetrahydrofuran | 100, Complete dissolution | 14 | 2.8 |
| Methyl Ethyl Ketone | 100, Complete dissolution | 12 | 3.8 |
| Trichloroethylene | 100, Complete dissolution | 15 | 3.5 |

Tables VIII through X serve to illustrate that polyblends containing nylon resins having less than seven methylene units separating each amide bond result in a significant loss of impact strength as compared to the significant increase in impact strength achieved by polyblends of this invention. The last entry shown in each Table is a polyblend of this invention and reference is made to the appropriate example in which the polyblend is taught.

TABLE VIII

| | Notched Izod (ft-lbs/in) | Gardner Falling Weight Index (in-lbs) |
|---|---|---|
| SMA-3 | 2.1 | 144 |
| SMA-3/Nylon 6 Blend (50:50) | 2.0 | 70 |
| SMA-3/ Nylon 6,6[2] Blend (50:50) | 1.4 | 77 |
| SMA-3/Nylon 6,6 Blend (50:50) | 1.3 | 64 |
| SMA-3/ Reinforced Nylon 6,6[3] Blend (50:50) | 1.5 | 64 |
| SMA-3/ Nylon 12 Blend (50:50) (Example 4) | 3.0 | >480 |

[1]Capron 8200 (Allied Chemical Co.)
[2]Zytel 42 (E.I. DuPont Co.)
[3]Zytel ST801 (E.I. DuPont Co.)

TABLE IX

| | Notched Izod (ft-lbs/in) | Gardner Falling Weight Index (in-lbs) |
|---|---|---|
| SMA-2 | 2.5 | 76 |
| SMA-2/ Nylon 6 Resin[1] (50:50) | 1.6 | 60 |
| SMA-2/ Nylon 6,6[2] Blend (50:50) | 1.4 | 56 |
| SMA-2/ Reinforced Nylon 6,6[3] Blend (50:50) | 1.5 | 56 |
| SMA-2/ Nylon 12 Blend (50:50) (Example 3) | 3.0 | 440 |

[1]Capron 8200 (Allied Chemical Co.)
[2]Zytel 42 (E.I. DuPont Co.)
[3]Zytel ST801 (E.I. DuPont Co.)

TABLE X

| | Notched Izod (ft-lbs/in) | Gardner Falling Weight Index (in-lbs) |
|---|---|---|
| SMA-1 | 1.8 | 70 |
| SMA-1/ Nylon 6 Blend (50:50) | 1.3 | 46 |
| SMA-1 Nylon 6,6[2] Blend | 1.3 | 56 |

TABLE X-continued

| | Notched Izod (ft-lbs/in) | Gardner Falling Weight Index (in-lbs) |
|---|---|---|
| (50:50) SMA-1/ Nylon 12 Blend (Example 2) | 2.5 | 370 |

[1]Capron 8200 (Allied Chemical Co.)
[2]Zytel 42 (E.I. DuPont Co.)

It will be evident from the foregoing that various modifications can be made to the present invention. Such, however, are considered as being within the scope of this invention.

What is claimed is:

1. A polyblend consisting essentially of from about 35 to about 70 weight percent of a polyamide resin having seven or more methylene units separating each amide bond and from about 65 to about 30 weight percent of an impact modified styrenic/$\alpha,\beta$unsaturated dicarboxylic anhydride or its imide derivative copolymer resin, wherein the copolymer resin is modified by conducting the polymerization of the copolymer in the presence of a rubber material and a thermoplastic elastomer, wherein said rubber material is a polymer having a glass transition temperature of less than or equal to $-40°$ C., with 70 to 100 percent by weight of the polymer being recurring units of at least one monomer selected from the group consisting of butadiene, ethylene, propylene and nonconjugated dienes and 30 to 0 percent by weight of the polymer being recurring units of at least one monomer selected from the group consisting of styrene and acrylonitrile, and wherein said thermoplastic elastomer is a polymer having a glass transition temperature of greater than or equal to $-25°$ C., with 5 to 35 percent by weight of said polymer being recurring units of butadiene and 65 to 95 percent by weight of said polymer being comprised of recurring units of at least one monomer selected from the group consisting of styrene and methylmethacrylate.

2. The polyblend of claim 1 in which said polyamide is nylon 8.

3. The polyblend of claim 1 in which said polyamide is nylon 11.

4. The polyblend of claim 1 in which said polyamide is nylon 12.

5. The polyblend of claim 1 in which said impact modified styrenic/$\alpha,\beta$-unsaturated dicarboxylic anhydride or its imide derivative copolymer resin comprises from about 70 to about 99 weight percent of a monoalkenyl aromatic monomer and from about 1 to about 30 weight percent of an $\alpha,\beta$-unsaturated dicarboxylic anhydride or its imide derivative.

6. The polyblend of claim 5 in which said monoalkenyl aromatic monomer is selected from the group consisting of styrene, para-methylstyrene, $\alpha$ methylstyrene, t-butylstyrene and halogenated styrene.

7. The polyblend of claim 6 in which said halogenated styrene is dibromostyrene.

8. The polyblend of claim 5 in which said unsaturated dicarboxylic anhydride or its imide derivative is selected from the group consisting of maleic anhydride and citraconic anhydride and their imide derivatives.

9. The polyblend of claim 1 in which said impact modified styrenic/$\alpha,\beta$-unsaturated dicarboxylic anhydride or its imide derivative copolymer resin contains from about 10 to about 25 weight % rubber material based on the total weight % of the copolymer resin including the weight of the rubber material and thermoplastic elastomer.

10. The polyblend of claim 1 in which said impact modified styrenic/$\alpha\beta$-unsaturated dicarboxylic anhydride or its imide derivative copolymer resin contains from about 14 to about 22 weight % rubber material based on the total weight % of the copolymer resin including the weight of the rubber material and thermoplastic elastomer.

11. The polyblend of claim 1 in which said impact modified styrenic/$\alpha,\beta$-unsaturated dicarboxylic anhydride or its imide derivative copolymer resin contains from about 1 to about 8 weight % thermoplastic elastomer based on the total weight % of the copolymer resin including the weight of the rubber material and thermoplastic elastomer.

12. The polyblend of claim 1 in which said impact modified styrenic/$\alpha,\beta$-unsaturated dicarboxylic anhydride or its imide derivative copolymer resin contains from about 2 to about 6 weight % thermoplastic elastomer based on the total weight % of the copolymer resin including the weight of the rubber material and thermoplastic elastomer.

13. The polyblend of claim 1 in which said impact modified styrenic/$\alpha,\beta$-unsaturated dicarboyxlic anhydride or its imide derivative copolymer resin is prepared by polymerizing a monoalkenyl aromatic monomer and an $\alpha,\beta$-unsaturated dicarboxylic anhydride or its imide derivative in the presence of said rubber material and said thermoplastic elastomer.

14. A molded article produced by molding the polyblend of claim 1.

* * * * *